No. 769,446. PATENTED SEPT. 6, 1904.
O. A. McFADDEN.
MACHINE FOR PULVERIZING LAND.
APPLICATION FILED DEC. 7, 1903.
NO MODEL.
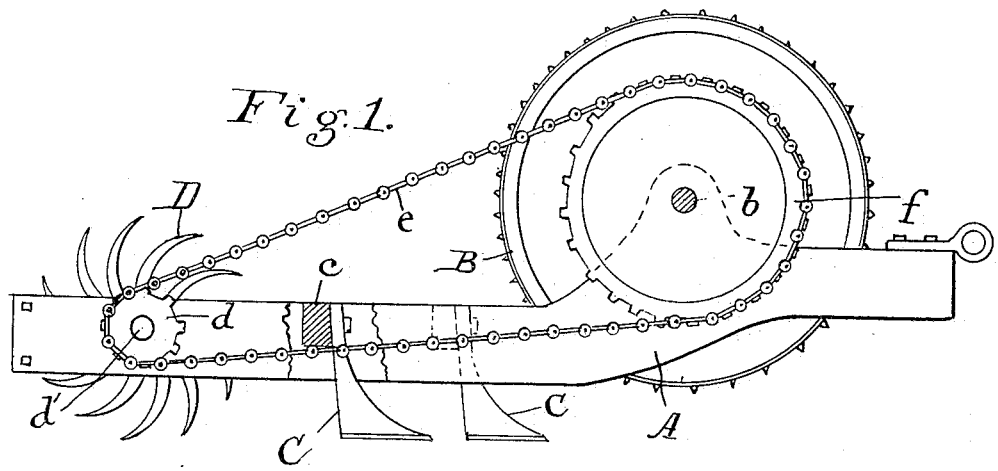
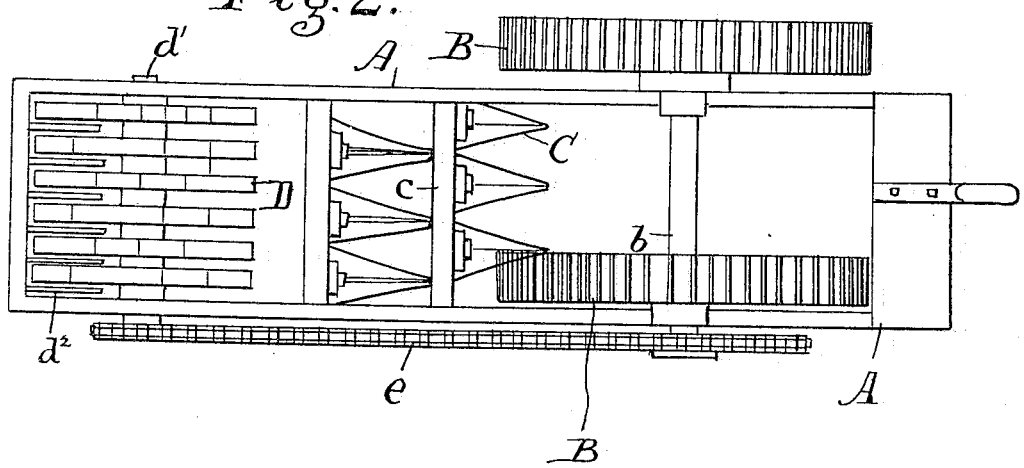
Witnesses
Inventor:

No. 769,446. Patented September 6, 1904.

UNITED STATES PATENT OFFICE.

ORIGEN A. McFADDEN, OF FAIRFIELD, MAINE.

MACHINE FOR PULVERIZING LAND.

SPECIFICATION forming part of Letters Patent No. 769,446, dated September 6, 1904.

Application filed December 7, 1903. Serial No. 184,059. (No model.)

*To all whom it may concern:*

Be it known that I, ORIGEN A. McFADDEN, a citizen of the United States of America, and a resident of Fairfield, Somerset county, State of Maine, have invented certain new and useful Improvements in Machines for Pulverizing Land, of which the following is a specification.

My invention relates to machines for pulverizing soil in preparing it for planting, and it is particularly designed to work prairie land and other similar land which is covered with turf, but free from rocks.

The invention consists, essentially, of a frame having a series of knives or cutters for cutting the turf into narrow strips and a pulverizing-head in the rear of said cutters having pulverizing-hooks in rapid rotation, whereby the strips of turf are thoroughly pulverized as soon as cut and the ground left in condition to be planted.

I illustrate my invention by means of the accompanying drawings, in which—

Figure 1 is a side elevation, and Fig. 2 is a plan.

The machine consists of a frame A, mounted on wheels B, with means for pulling it. The wheels B are mounted on a fixed axle $b$, journaled to the frame. Attached to the frame are cross-bars $c$, and secured to the cross-bars and extending down below the frame are cutters C, adapted to cut the turf into strips and to loosen said strips from the subsoil. They have vertical knives for cutting the strips and horizontal blades for loosening the strips. The strips of sod are pulverized by means of a rotating pulverizing-head D in rear of the cutters, having pulverizing-hooks which rotate, rapidly cutting the turf into small pieces and pulverizing the soil. The hooks are arranged in sections on the shaft $d'$, and between each section on the rear side projects a pin $d^2$, which serves to help pulverize the soil and preventing its accumulation on the hooks. The head D is rotated by any suitable mechanism. As here shown, there is a sprocket-wheel $d$ on the end of the shaft $d'$ and a larger sprocket-wheel $f$ on the main axle $b$, connected by a sprocket-chain $e$. The turning of the wheels B and the shaft $b$ operates the head D.

The machine above described is capable of doing the work of a plow and a harrow when the soil is of the right quality, and it is well adapted to prepare the alluvial lands of the West for planting.

I claim—

In a machine for pulverizing soil, the combination of a frame, wheels supporting said frame, a set of turf-cutters secured to said frame and projecting downward therefrom for cutting the turf into strips and separating said strips from the subsoil, a rotating pulverizing-head rigidly secured in rear of said cutters having pulverizing-hooks and means for revolving said pulverizing-head more rapidly than said wheels.

Signed at Portland, Maine, this 14th day of November, 1903.

ORIGEN A. McFADDEN.

Witnesses:
S. W. BATES,
L. M. GODFREY.